US008967781B2

(12) United States Patent
Ageishi et al.

(10) Patent No.: US 8,967,781 B2
(45) Date of Patent: Mar. 3, 2015

(54) IMAGE RECORDING COMPOSITION, IMAGE RECORDING INK SET AND RECORDING APPARATUS

(75) Inventors: Kentaro Ageishi, Kanagawa (JP); Yoshiro Yamashita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1246 days.

(21) Appl. No.: 12/326,287

(22) Filed: Dec. 2, 2008

(65) Prior Publication Data

US 2009/0318613 A1 Dec. 24, 2009

(30) Foreign Application Priority Data

Jun. 20, 2008 (JP) ................................ 2008-162051

(51) Int. Cl.

| | |
|---|---|
| ***B41J 2/01*** | (2006.01) |
| ***B41J 2/015*** | (2006.01) |
| ***B41J 2/17*** | (2006.01) |
| ***B41J 2/175*** | (2006.01) |
| ***C08K 5/06*** | (2006.01) |
| ***C08L 83/00*** | (2006.01) |
| ***C08L 83/04*** | (2006.01) |
| ***C09D 5/00*** | (2006.01) |
| ***C09D 11/00*** | (2014.01) |
| ***C09J 7/02*** | (2006.01) |
| ***G01D 11/00*** | (2006.01) |
| ***B41M 5/00*** | (2006.01) |
| ***B41M 5/025*** | (2006.01) |
| ***B41M 7/00*** | (2006.01) |

(52) U.S. Cl.

CPC ........... *B41M 5/0011* (2013.01); *B41M 5/0256* (2013.01); *B41M 7/0045* (2013.01); *B41M 2205/12* (2013.01)

USPC .................. 347/100; 347/1; 347/21; 347/84; 347/85; 347/95; 347/96; 347/102; 347/103; 524/366; 524/588

(58) Field of Classification Search

USPC ......... 523/160, 161; 524/366, 588; 347/1, 21, 347/84, 85, 95, 96, 100, 102, 103

See application file for complete search history.

(56) References Cited

U.S. PATENT DOCUMENTS

| | | | | |
|---|---|---|---|---|
| 6,001,466 | A | 12/1999 | Noguchi et al. | |
| 6,257,716 | B1 * | 7/2001 | Yanagawa et al. | 347/102 |
| 2001/0038409 | A1 | 11/2001 | Yanagawa et al. | |
| 2001/0055047 | A1 | 12/2001 | Ohsawa et al. | |
| 2001/0055728 | A1 | 12/2001 | Shibata | |
| 2003/0068571 | A1 | 4/2003 | Uehara et al. | |
| 2005/0031348 | A1 | 2/2005 | Choi et al. | |
| 2005/0031384 | A1 | 2/2005 | Sohmiya et al. | |
| 2005/0110856 | A1 | 5/2005 | Mouri et al. | |
| 2005/0259138 | A1 | 11/2005 | Doi | |
| 2006/0164487 | A1 | 7/2006 | Kadomatsu et al. | |
| 2007/0034152 | A1 | 2/2007 | Nakagawa et al. | |
| 2008/0062241 | A1 | 3/2008 | Yamashita et al. | |
| 2009/0318591 | A1 | 12/2009 | Ageishi et al. | |

FOREIGN PATENT DOCUMENTS

| | | |
|---|---|---|
| CN | 1911532 | 2/2007 |
| JP | 7-169100 | 7/1995 |
| JP | 9-263038 | 10/1997 |
| JP | 10-255331 | 9/1998 |
| JP | 11-188858 | 7/1999 |
| JP | 11-259913 | 9/1999 |
| JP | 2000-94654 | 4/2000 |
| JP | 2000-343808 | 12/2000 |
| JP | 2001-10114 | 1/2001 |
| JP | 2001-212956 | 8/2001 |
| JP | 2001-315426 | 11/2001 |
| JP | 2002-321443 | 11/2002 |
| JP | 2002-370347 | 12/2002 |
| JP | 2003-57967 | 2/2003 |
| JP | 2004-148530 | 5/2004 |
| JP | 2005-170036 | 6/2005 |
| JP | 2007-58952 | 3/2007 |
| JP | 2008-068429 | 3/2008 |
| JP | 2008-100501 | 5/2008 |

OTHER PUBLICATIONS

USPTO Office Action, U.S. Appl. No. 12/326,248; May 18, 2010.
USPTO Office Action, U.S. Appl. No. 12/326,248; Sep. 24, 2010.
USPTO Office Action, U.S. Appl. No. 12/326,248; Apr. 4, 2011.
USPTO Office Action; U.S. Appl. No. 12/325,595; dated Aug. 9, 2011.
USPTO Office Action; U.S. Appl. No. 12/361,039; dated Sep. 29, 2011.
USPTO Office Action; U.S. Appl. No. 12/326,248; dated Oct. 28, 2011.
English translation of Chinese Office Action; A.N. 200910003410.0; dated Nov. 30, 2011.
Espacenet Bibliographic data: CN1911532 (A); dated Feb. 14, 2007.

* cited by examiner

*Primary Examiner* — Patrick Niland

(74) *Attorney, Agent, or Firm* — Fildes & Outland, P.C.

(57) ABSTRACT

An image recording composition including a curable material that is cured upon application of an external stimulus, water-absorbing resin particles, and a nonionic surfactant.

3 Claims, 4 Drawing Sheets

IMAGE RECORDING COMPOSITION, IMAGE RECORDING INK SET AND RECORDING APPARATUS

CROSS-REFERENCE TO RELATED APPLICATION

This application is based on and claims priority under 35 USC 119 from Japanese Patent Application No. 2008-162051 filed Jun. 20, 2008.

BACKGROUND

1. Technical Field

The present invention relates to an image recording composition, an image recording ink set and a recording apparatus.

2. Related Art

An inkjet recording system constitutes one method of recording images, data, and the like with the use of ink. The principle of the inkjet recording system is such that an image is formed on a medium made of paper, cloth, or a film, by ejecting an ink in the form of a liquid or a melted solid through a nozzle, a slit, a porous film, or the like. Various methods of ejecting ink have been proposed, including a so-called charge-control system in which ink is ejected by means of an electrostatic attractive force; a so-called drop-on-demand system (pressure pulse system) in which ink is ejected by means of oscillating pressure in a piezoelectric element; a so-called thermal inkjet system in which ink is ejected by means of pressure generated by forming and growing air bubbles using a high temperature; and the like. By employing these systems, recorded materials portraying an image or data with extremely high fineness can be obtained.

In order to perform recording of an image or data with high fineness on various recording media including both permeable media and impermeable media, a method of recording an image onto an intermediate transfer member and then transferring the image onto a recording medium has been applied in recording systems using ink, including the aforementioned inkjet recording systems.

SUMMARY

According to an aspect of the invention, there is provided an image recording composition comprising: a curable material that is cured upon application of an external stimulus, water-absorbing resin particles, and a nonionic surfactant.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in details. The image recording composition used in the exemplary embodiments of the invention includes a curable material that is cured upon application of an external stimulus water-absorbing resin particles, and a nonionic surfactant, wherein the solubility parameter value, or SP value, of the curable material is from 9 or about 9 to 19 or about 19.

The image recording composition is supplied onto an intermediate transfer member or a recording medium to form a curable layer thereon, and an image is formed by ejecting an aqueous ink including an aqueous medium onto the curable layer.

Hereinafter, exemplary embodiments of the invention will be explained with reference to the drawings. The same denotations are given to the members having the same function in all drawings, and overlapping explanations may be omitted.

First Exemplary Embodiment

Figure 1:
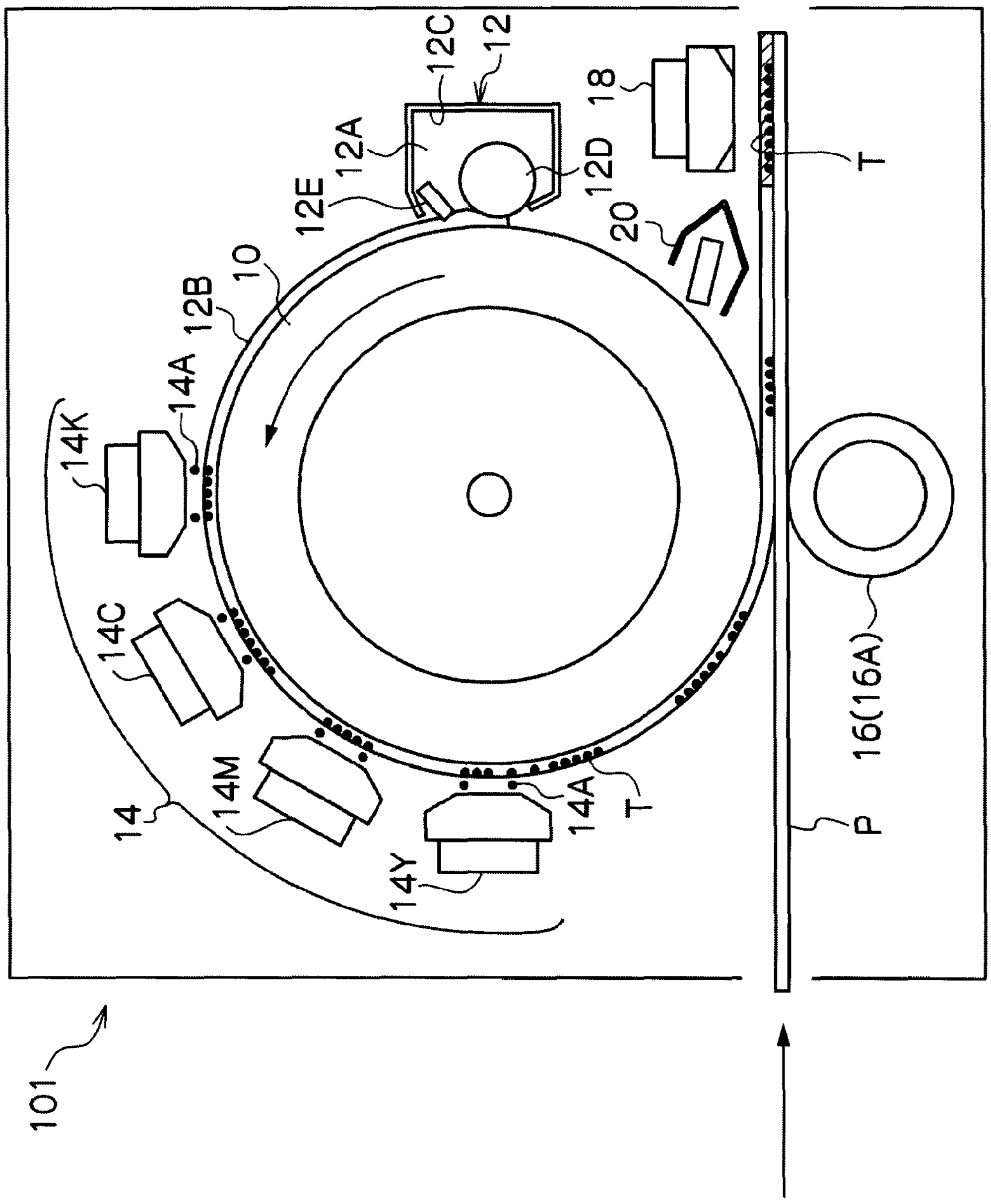
FIG. 1 is a configurational drawing showing a recording apparatus according to a first exemplary embodiment of the invention.

FIG. 1 is a configurational drawing showing a recording apparatus according to a first exemplary embodiment of the invention.

As shown in FIG. 1, a recording apparatus 101 according to a first exemplary embodiment includes, for example, an intermediate transfer drum 10; a image recording composition supply unit 12 that forms, onto the intermediate transfer drum 10, a curable layer 12B by supplying a image recording composition 12A containing at least a curable material that is cured by an external stimulus (energy such as heat, UV rays and electron beams) and water-absorbing resin particles; an inkjet recording head 14 that forms an image T by ejecting aqueous ink droplets 14A including an aqueous medium onto the curable layer 12B; a transfer unit 16 that transfers the curable layer 12B, on which the image T is formed, onto a recording medium P by positioning the recording medium P on the intermediate transfer drum 10 and applying a pressure thereto; and a stimulus application unit 18 that applies a stimulus by which the curable layer 12B that has been transferred onto the recording medium P is cured.

Further, in the downstream of the transfer unit 16 in a direction in which the intermediate transfer drum 10 rotates may be positioned a cleaning unit 20 that removes a residue from the curable layer 12B remaining on the surface of the intermediate transfer drum 10, and other foreign matters attached to the intermediate transfer drum 10 such as paper powder from the recording medium P, and the like.

The intermediate transfer drum 10 may have, for example, a cylindrical substrate and a surface layer covering the surface of the cylindrical substrate. The intermediate transfer drum 10 may have a width (the length in an axial direction) that is equal to or wider than the width of the recording medium P.

The materials for the cylindrical substrate include, for example, aluminum, stainless steel (SUS), copper, and the like.

The materials for the surface layer include, for example, various kinds of resins (such as polyimide, polyamideimide, polyester, polyurethane, polyamide, polyether sulfone, and fluorine-based resin), various kinds of rubbers (such as nitrile rubber, ethylene propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber, and fluororubber), and the like. The surface layer may have a single layer structure or a laminated structure.

The supply unit 12 includes, for example, a supply roller 12D that supplies the image recording composition 12A to the intermediate transfer drum 10, and a blade 12E that regulates the thickness of the curable layer 12B formed from the supplied image recording composition 12A, in a housing 12C in which the image recording composition 12A is stored.

The supply roller 12D in the supply unit 12 may be in contact with the intermediate transfer drum 10 in a continuous manner, or may be positioned apart from the intermediate transfer drum 10. Further, the supply unit 12 may supply the image recording composition 12A to the housing 12C from an independent supply system (not shown) so that the image recording composition 12A can be continuously supplied.

Here, the "curable material that cures upon application of an external stimulus (energy)" contained in the image recording composition 12A refers to a material that is cured by an external stimulus to become a "curable resin". Specific examples of such materials include curable monomers, curable macromers, curable oligomers, and curable prepolymers. Details of these materials will be described later.

The "water-absorbing resin particles" refers to particles formed from a material that absorbs an aqueous medium. Details of these materials will be described later.

The structure of supply unit 12 is not limited to the above configuration, and may be those utilizing known supplying methods including application methods such as bar coater coating, spray coating, inkjet coating, air-knife coating, blade coating, and roll coating.

The inkjet recording head 14 includes, for example, recording heads for each color including a recording head 14K for ejecting an black ink, a recording head 14C for ejecting a cyan ink, a recording head 14M for ejecting a magenta ink, and a recording head 14Y for ejecting a yellow ink, positioned in this order from the upstream side in a direction in which the intermediate transfer drum 10 rotates. Of course, the structure of the recording head 14 is not limited to the above configuration, and may not include all of the recording heads 14K, 14C, 14M and 14Y.

Each recording head 14 is preferably, for example, a line-type inkjet recording head having a width equal to or wider than the width of a recording medium P, but a conventional scan-type inkjet recording head may also be used. The method of ejecting ink of each recording head 14 may be any method in which ink can be ejected, such as a piezo-electric-element-driving method and a heater-element-driving method.

Each recording head 14 may be arranged, for example, in series in the order of the recording head 14K, the recording head 14C, the recording head 14M and the recording head 14Y from the upstream side in a direction of rotation of the intermediate transfer drum 10.

Each recording head 14 may be arranged in such a manner that the distance between the surface of the intermediate transfer drum 10 and the nozzle face of the head is, for example, from about 0.3 mm to about 0.7 mm. Further, each recording head 14 is arranged, for example, such that the longitudinal direction thereof intersects with the rotation direction of the intermediate transfer drum 10 (desirably in a perpendicular manner).

The transfer device 16 includes a pressure roll 16A which is arranged so that the pressure roll 16A is pressed against the intermediate transfer drum 10. The pressure roll 16A may be formed from, for example, materials similar to those used for the intermediate transfer drum 10.

A stimulus application unit 18 is selected in accordance with the kind of the curable material contained in the image recording composition 12A. Specifically, for example, when the curable material is a material that is curable upon irradiation with ultraviolet rays, an ultraviolet-ray irradiation unit that irradiates the image recording composition 12A (or the curable layer 12B formed from the image recording composition 12A) with ultraviolet rays is used as the stimulus application unit 18. When the curable material is a material that is curable upon irradiation with electron beams, an electron-beam irradiation unit that irradiates the image recording composition 12A (or the curable layer 12B formed from the image recording composition) with electron beams is used as the stimulus application unit 18. Furthermore, when the material is a material that is curable upon application of heat, a heat application unit that applies heat to the image recording composition 12A (or the curable layer 12B formed from the image recording composition 12A) is used as the stimulus application unit 18.

The ultraviolet-ray irradiation unit may be, for example, a metal halide lamp, a high-pressure mercury lamp, an ultra high-pressure mercury lamp, a deep ultraviolet-ray lamp, a lamp that excites a mercury lamp externally with a microwave ultraviolet laser without using an electrode, a xenon lamp, a UV-LED, and the like.

The conditions for the irradiation with ultraviolet rays are not specifically limited as long as the image recording composition 12A containing a material that is curable upon irradiation with ultraviolet rays (or the curable layer 12B formed from the image recording composition 12A) is fully cured, and may be selected depending on the type of the material that is curable upon irradiation with ultraviolet rays or the thickness of the curable layer 12B formed from the image recording composition 12A, and the like. For example, the irradiation may be conducted with a high-pressure mercury lamp at a power density of 120 W/cm for from 2 s to several ten ms.

The electron-beam irradiation unit may be, for example, a scan-type unit or a curtain-type unit. The curtain-type electron-beam irradiation unit is a device in which thermoelectrons generated at a filament is drawn out by a grid in a vacuum chamber, which are accelerated to form an electron current by a high voltage (for example, 70 kV to 300 kV), and the electron current passes through a window foil to be discharged into the atmosphere. The wavelength of the electron beams is generally shorter than 1 nm, and the energy of the electron beams can be up to several MeVs, but the electron beams having a wavelength in an order of pm and energy of several ten keV to several hundred keV are normally used.

The conditions for irradiation with the electron beams are not specifically limited as long as the image recording composition 12A (or the curable layer 12B formed from the image recording composition 12A) is fully cured, and may be selected depending on the type of the electron beam-curable material, the thickness of the curable layer 12B, and the like. For example, the irradiation may be conducted with an electron beam quantity of from 5 to 100 kGy levels.

The heat application unit may be, for example, a halogen lamp, a ceramic heater, a Nichrome-wire heater, a microwave heater, an infrared-ray lamp, and the like. A heating device employing an electromagnetic induction method is also applicable.

The conditions for applying heat are not specifically limited as long as the image recording composition 12A containing a material that can be cured by heat (or the curable layer 12B formed from the image recording composition 12A) is fully cured, and may be selected depending on the type of the material that can be cured by heat, the thickness of the curable layer 12B, and the like. For example, the application of heat may be conducted at a temperature of 200° C. for 5 minutes, in the atmosphere.

The above-mentioned state that is "fully cured" refers to a state in which transfer does not occur even when a sheet of paper having permeability (plain paper) is put on the curable layer 12B, which has been cured by the stimulus application unit 18, and a load of 200 g is applied thereon.

The recording medium P may be either a permeable medium (for example, plain paper, coat paper and the like) or a non-permeable medium (for example, art paper, resin film, and the like). However, the recording medium is not restricted thereto and may be other industrial products, such as a semiconductor substrate.

In the following, an image recording process using the recording apparatus 101 according to the present exemplary embodiment will be explained.

In the recording apparatus 101 according to the present exemplary embodiment, the intermediate transfer drum 10 is driven to rotate, and the image recording composition 12A is supplied onto the surface of the intermediate transfer drum 10 from the supply unit 12 to form a curable layer 12B.

The thickness of the curable layer 12B is not specifically restricted, but may be from 0.5 μm to 50 μm.

Further, for example, when the curable layer 12B has a thickness through which ink droplets 14A do not reach the bottom of the layer 12B, the portion in which the ink droplets 14A exist in the curable layer 12B will not be exposed after the transferring of the layer 12B onto the recording medium P, and thus the region in which the ink droplets 14A are absent may serve as a protective layer after being cured.

Next, the ink droplets 14A ejected from the inkjet recording head 14 are applied to the curable layer 12B that has been supplied onto the intermediate transfer drum 10. The inkjet recording head 14 applies the ink droplets 14A to a predetermined position in the curable layer 12B in accordance with the image information.

In this case, the ejection of the ink droplets 14A from the inkjet recording head 14 is performed on the intermediate transfer drum 10 having a rigid body. Therefore, the ejection of the ink droplets 14A is performed on the curable layer 12B in such a state that the surface of the drum is not flexed.

Next, a recording medium P is nipped between the intermediate transfer drum 10 and the transfer unit 16, and a pressure is applied to the curable layer 12B to transfer the curable layer 12B on which an image is formed by the ink droplets 14A onto the recording medium P.

Next, the image T formed by the ink droplets 14A is fixed onto the recording medium P by means of a curable resin, by curing the curable layer 12B by applying a stimulus by the stimulus application unit 18. In this way, the curable resin layer (image layer) having the image T formed from the ink droplets 14A is formed on the recording medium P.

Thereafter, residues of the curable layer 12B and adhesion matters remaining on the surface of the intermediate transfer drum 10, from which the curable layer 12B has been transferred to the recording medium P, are removed by a cleaning unit 20. The image recording process is repeated by supplying the image recording composition 12A onto the intermediate transfer drum 10 from the supply unit 12 and forming the curable layer 12B.

As described above, image recording is performed in the recording apparatus 101 according to the present exemplary embodiment.

The surface roughness (Rz) of the curable layer (image layer) is preferably 20 μm or less, more preferably 15 μm or less. The maximum roughness (Rmax) is preferably 20 μm or less, more preferably 15 μm or less. The Rz may be measured in accordance with JIS-B0601 (1982) and the Rmax may be measured in accordance with JIS-B0601 (1994), respectively, the disclosure of which is incorporated herein by reference.

Second Exemplary Embodiment

Figure 2:
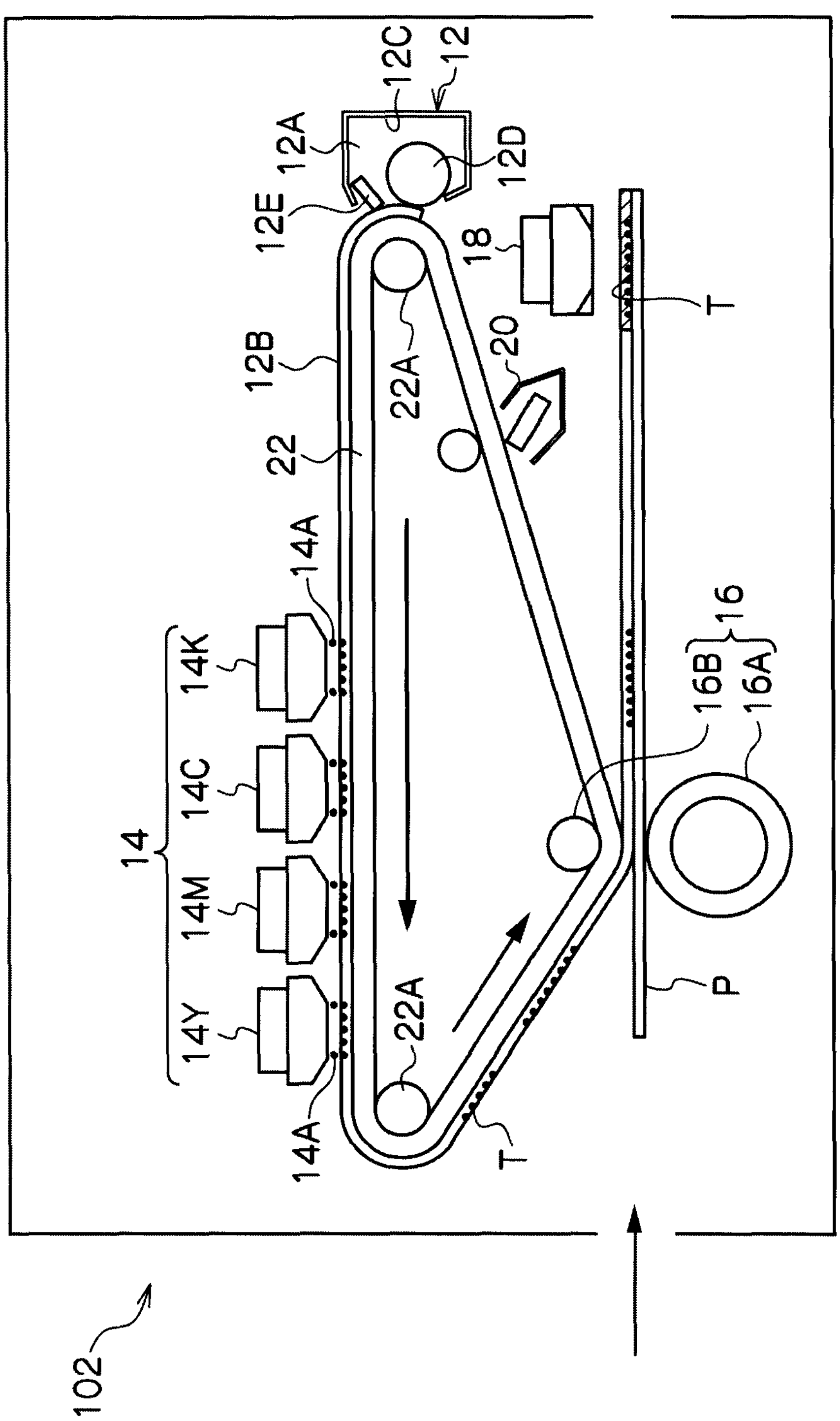
FIG. 2 is a configurational drawing showing a recording apparatus according to a second exemplary embodiment of the invention.

FIG. 2 is a configurational drawing showing a recording apparatus according to a second exemplary embodiment of the invention.

As shown in FIG. 2, the recording apparatus 102 according to the second exemplary embodiment has an intermediate transfer belt 22 in place of the intermediate transfer drum 10 in the first exemplary embodiment.

The intermediate transfer belt 22 is, for example, rotatably supported by two support rollers 22A and a pressure roller 16B (transfer unit 16) while a tension is applied from the inner side of the belt.

The intermediate transfer belt 22 has a width (the length in an axial direction) equal to or wider than the width of the recording medium P. The intermediate transfer belt 22 may be formed from various kinds of resins (such as polyimide, polyamideimide, polyester, polyurethane, polyamide, polyether sulfone, and fluorine-based resins), various kinds of rubbers (such as nitrile rubber, ethylene-propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber and fluororubber), and the like. The intermediate transfer belt 22 may have a single-layer structure or a laminated structure. The intermediate transfer belt 22 may have a surface layer formed from a releasable material such as a fluorine-based resin or silicone rubber.

Each recording head 14 is positioned in a region in which the intermediate transfer belt 22 is not flexed, with a distance between the nozzle face of the head and the surface of the intermediate transfer belt 22 of from about 0.7 mm to about 1.5 mm, for example.

The transfer unit 16 includes, for example, a pair of pressure rollers 16A and 16B that are positioned opposite to one another via the intermediate transfer belt 22.

In the recording apparatus 102 according to the present exemplary embodiment, ink droplets 14A are ejected from the inkjet recording head 14 and applied onto the curable layer 12B that has been formed on the intermediate transfer belt 22.

The ejection of the ink droplets 14A from the inkjet recording head 14 is performed in a region in which the intermediate transfer belt 22 is not flexed. Therefore, the ink droplets 14A are ejected onto the curable layer 12B in such a state that the surface of the belt is not flexed.

Since matters other than the above are the same as those of the first exemplary embodiment, explanations thereof will be omitted.

Third Exemplary Embodiment

Figure 3:
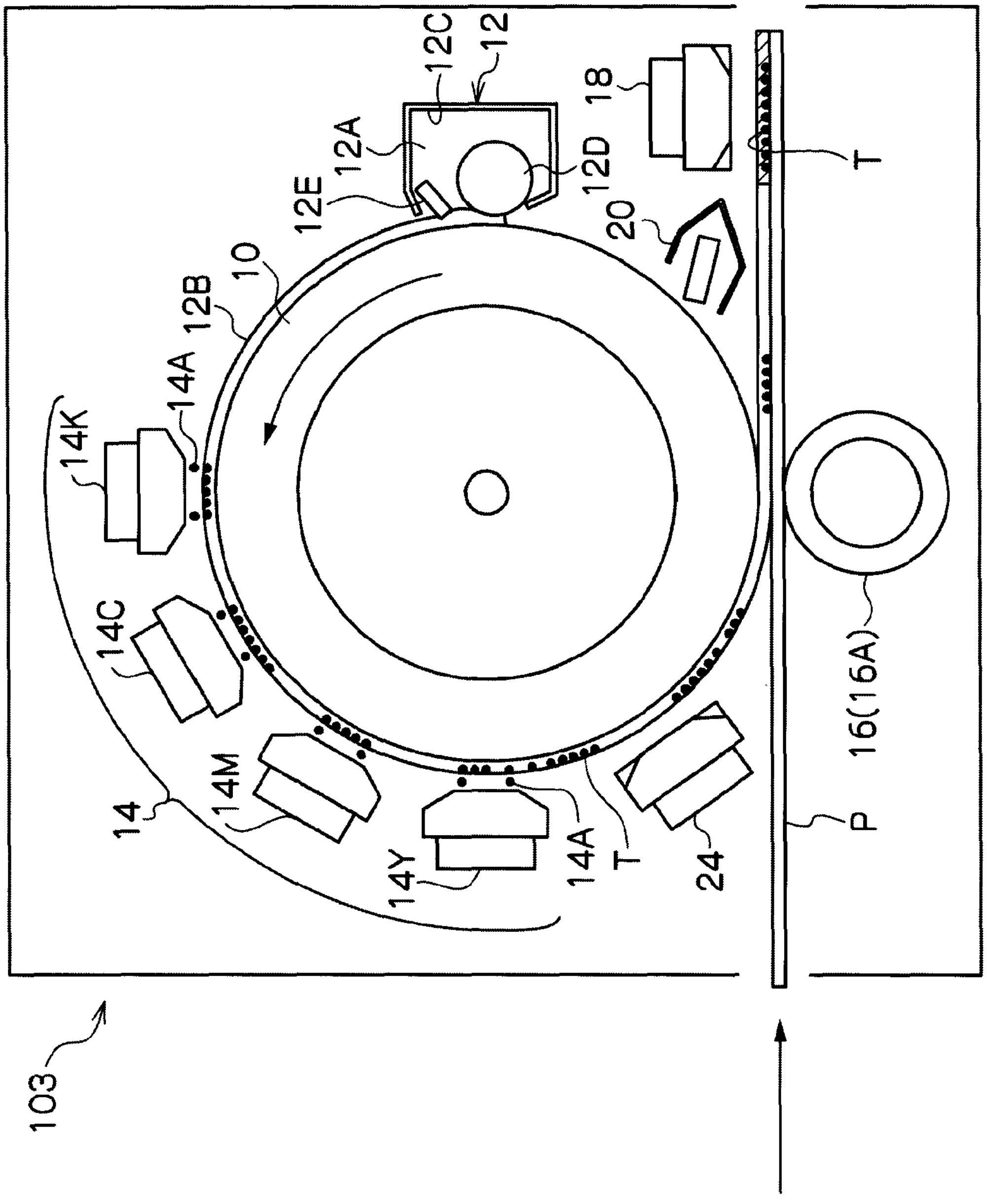
FIG. 3 is a configurational drawing showing a recording apparatus according to a third exemplary embodiment of the invention; and, FIG. 4 is a configurational drawing showing a recording apparatus according to a fourth exemplary embodiment of the invention.

FIG. 3 is a configurational drawing showing a recording apparatus according to a third exemplary embodiment of the invention.

As shown in FIG. 3, a recording apparatus 103 according to the third exemplary embodiment includes a second stimulus application unit 24, which partially cures the curable layer 12B on which an image is formed from ink droplets 14A before the curable layer 12B is transferred onto a recording medium P.

The second stimulus application unit 24 is arranged, for example, downstream of the inkjet recording head 14 but upstream of the transfer device 16, in a rotation direction of the intermediate transfer belt 22.

The second stimulus application unit 24 may be selected depending on the type of the curable material included in the image recording composition 12A, in a similar manner to the stimulus application unit 18. Specifically, when the curable material is a material that is curable by ultraviolet rays, for example, an ultraviolet-ray irradiation unit that irradiates the image recording composition 12A (or the curable layer 12B formed from the image recording composition 12A) with ultraviolet rays is used as the second stimulus application unit 24. When the curable material is a material that is curable by electron beams, an electron-beam irradiation unit that irradiates the image recording composition 12A (or the curable layer 12B formed from the image recording composition 12A) is used as the second stimulus apply device 24. Further, when the curable material is a material that is curable by heat, a heat application unit that applies heat to the image recording composition 12A (or the curable layer 12B formed from the image recording composition 12A) is used as the second stimulus application unit 24.

The conditions of applying ultraviolet rays, electron beams, or heat by the second stimulus application unit 24 are not specifically restricted, and may be selected depending on the type of the curable material, the thickness of the curable layer and the like, as long as the curable layer 12B on which ink droplets 14A are applied by the inkjet recording head 14 is partially cured when transferred from the intermediate transfer drum 10 to a recording medium P by the transfer unit 16.

In this exemplary embodiment, the second stimulus application unit 24 is arranged downstream of the inkjet recording head 14 and upstream of the transfer device 16, but the second stimulus application unit 24 may be arranged upstream of the inkjet recording head 14. When the second stimulus application unit 24 is arranged upstream of the inkjet recording head 14, ink droplets 14A are ejected from the inkjet recording head 14 to the curable layer 12B that has been partially cured to have an increased viscosity. Accordingly, diffusion of the ink droplets 14A in the curable layer 12B is further suppressed, and an image with a higher definition can be formed.

Here, the state of being "partially cured" refers to a state in which the curable material is not "fully cured", but is cured to some extent, as compared with the curable material in a fully liquid state at the time of being supplied onto the intermediate transfer member. Whether or not the curable material is in a state of being "partially cured" can be determined by the following manner. Namely, when transfer of the curable layer 12B to a sheet of paper having permeability (such as plain paper) put on the curable layer 12B does not occur when no load is applied, but occurs with a load of 200 g, it can be determined that the curable layer 12B is partially cured.

In the recording apparatus 103 according to the present exemplary embodiment as described above, the curable layer 12B is partially cured by the second stimulus application unit 24 after the application of the ink droplets 14A ejected from the inkjet recording head 14 onto the curable layer 12B that has been supplied onto the intermediate transfer drum 10, and then the curable layer 12B is transferred onto the recording medium P by the transfer device 16. At the time of the transferring, the curable layer 12B is in a state of being partially cured, namely, having a certain degree of rigidity, and is transferred onto the recording medium P.

Since matters other than the above are the same as those of the first exemplary embodiment, explanations thereof will be omitted.

Fourth Exemplary Embodiment

Figure 4:
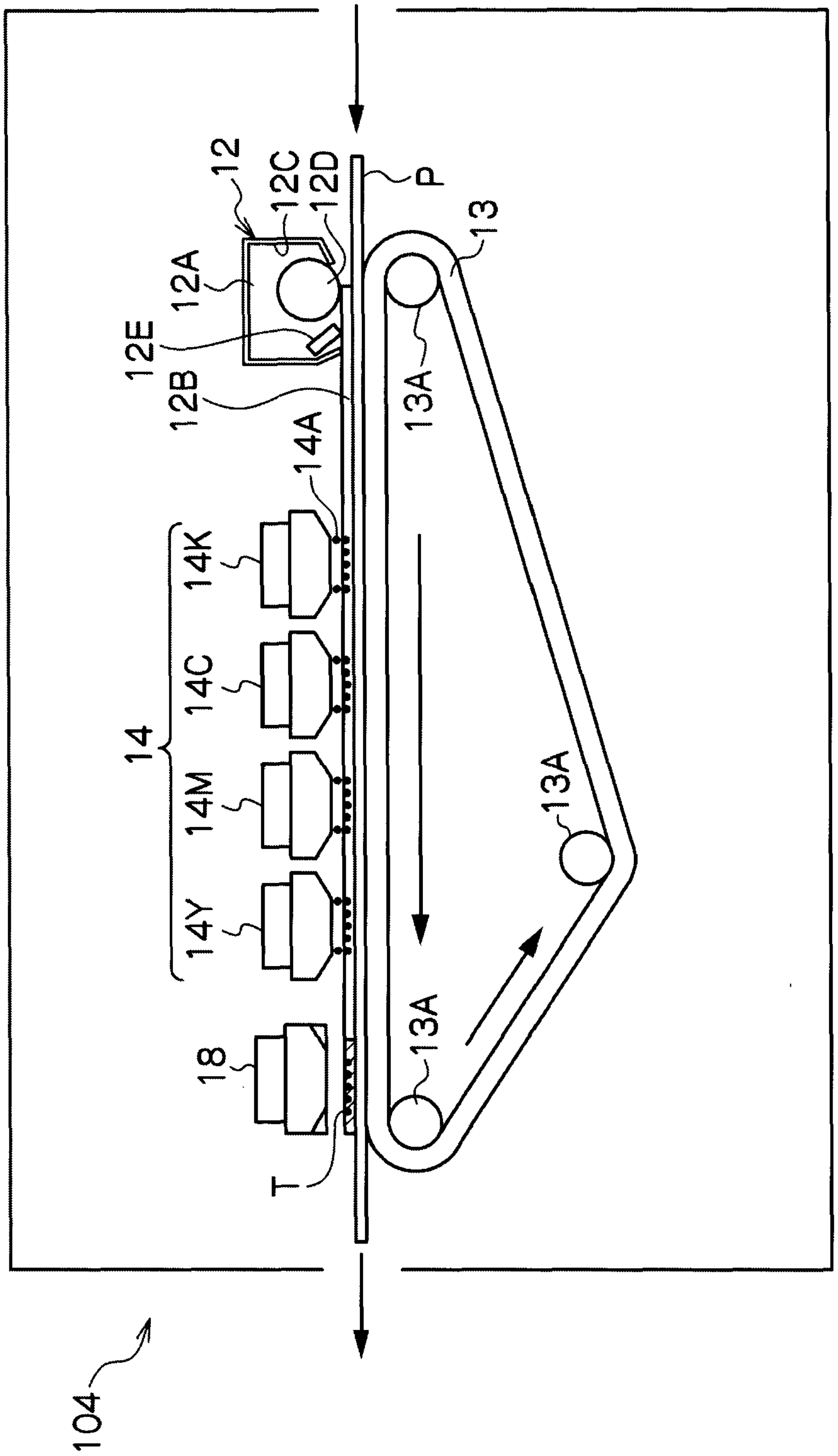

FIG. 4 is a configurational drawing showing a recording apparatus according to a fourth exemplary embodiment of the invention.

As shown in FIG. 4, the recording apparatus 104 according to the fourth exemplary embodiment has a structure in which an image is directly formed on a recording medium P (direct recording system).

The recording apparatus 104 includes, for example, a supply unit 12 that supplies an image recording composition 12A, containing a curable material that is curable upon application of an external stimulus (energy), water-absorbing resin particles and a nonionic surfactant, onto a recording medium P to form a curable layer 12B from the image recording composition 12A; an inkjet recording head 14 that forms an image T by ejecting ink droplets 14A onto the curable layer 12B; and a stimulus application unit 18 that applies a stimulus to cure the curable layer 12B.

Further, the recording apparatus 104 includes a conveyor belt 13 that conveys the recording medium P. The conveyor belt 13 may be, for example, an endless belt similar to the intermediate transfer belt 22 in the second exemplary embodiment. For example, the conveyor belt 13 is rotatably supported by three support rollers 13A while applying a tension from the inner side of the belt. The conveyor belt 13 conveys the recording medium P supplied from a storage container (not shown) and the like, in a direction shown by an arrow by rotating.

In the recording apparatus 104, a curable layer 12B is formed from an image recording composition 12A supplied from a supply unit 12 onto the surface of a recording medium P being conveyed by the conveyor belt 13. Subsequently, ink droplets 14A are ejected from an inkjet recording head 14 in accordance with the image information, and an image T is formed by the ink droplets 14A supplied onto the curable layer 12B formed on the recording medium P. Finally, the curable layer 12B is cured by the stimulus application unit 18, and the curable resin layer (image layer) including the image T formed from the ink droplets 14A is formed on the recording medium P.

Since matters other than the above are the same as those of the first exemplary embodiment, explanations thereof will be omitted.

In the recording apparatuses according to the exemplary embodiments described above, the image recording composition 12A is applied to the intermediate transfer drum 10, the intermediate transfer belt 22, or the recording medium P, to form the curable 12B. After the ink droplets 14A are applied to the curable layer 12B to form an image T (in the first to third exemplary embodiments, after further transferring the curable layer 12B to the recording medium P), the curable layer 12B on which the image is formed is completely cured. At this time, the curable material contained in the curable layer 12B is cured to turn to a "cured resin". Accordingly, an image can be formed on various recording media P, regardless of whether the recording medium P is an impermeable medium or a permeable medium.

In particular, in the recording apparatuses of the first to third exemplary embodiments, employing an intermediate transfer system, the curable layer 12B on the intermediate transfer member (intermediate transfer drum 10 or the intermediate transfer belt 22), on which an image T is formed, is transferred onto the recording medium P. Therefore, for example, when the curable layer 12B has a thickness through which the ink droplets 14A do not reach the bottom of the curable layer 12B, the portion where the ink droplets 14A are present (the portion corresponding to image T) in the curable layer 12B that has been transferred to the recording medium P is not exposed, and the portion where the ink droplets 14 are absent of the curable layer 12B may serve as a protective layer after being cured, thereby enhancing image maintainability.

On the other hand, in the recording apparatus according to the fourth exemplary embodiment, since a system in which the image recording composition 12A is directly supplied onto the recording medium P (direct-recording system) is employed, the structure of the recording apparatus can be simplified, thereby enabling image formation at high speed and low cost.

Further, in each of the recording apparatuses according to the exemplary embodiments as described above, an image recording composition 12A (image recording composition) contains a curable material that is cured upon application of an external stimulus, water-absorbing resin particles, and a nonionic surfactant, wherein the SP value of the curable material is from about 9 to about 19. The aqueous medium included in the aqueous ink droplets 14A is absorbed in the water-absorbing resin particles and the ink droplets 14A are fixed within the curable later 12B, thereby forming an image.

Hereinafter, the image recording composition 12A will be described in detail.

The curable material contained in the image recording composition 12A has an SP value of from 9 or about 9 to 19 or about 19, preferably from 9 to 18, more preferably from 9 to 13, and yet more preferably from 9 to 12.

The above SP value of the curable material is calculated from Fedors' formula. There are also method of calculating the SP value based on the material's chemical composition, physical properties, compatibility from a known material, and the like, considering evaporation heat, refraction index, dipole excitation, entropy, the sum of attractive constants of atoms or atom groups of the compound, hydrogen bond, and the like. In the method of Fedors, an SP value at 25° C. is calculated from the chemical structure of the material.

The SP value of the curable material can be regulated by selecting the type of the hetero atom, the number of molecular unit of ethylene oxide, polypropylene oxide, acrylate, methacrylate or the like, alkylene chain, aliphatic or hetercyclic unit, or a terminal functional group.

The hydrophobic monomers having a particularly low SP value include various kinds of polyether-modified acrylates and alicyclic acrylates, such as methoxypolyethylene glycol (9.3), lauryl acrylate (8.7), pentamethylpiperidyl methacrylate (8.7), ethoxyphenyl acrylate (9.6), tetrahydrofurfryl acrylate (9.2), dicyclopentanyl acrylate (9.3), di- or tripropyleneglycol acrylate (9 to 9.5), 1,6-hexanediol diacrylate (9.6), polyethyleneglycol diacrylates (9.5 to 9.7), vinyloxyethoxyethyl acrylate (8.7), vinyloxyethoxyethyl methacryalte (8.7), ethyleneoxide-modified polypropyleneglycol dimethacrylate (8.2), neopentylglycol diacrylate (9.4), tricyclodecanemethanol diacrylate (9.7), polypropylene glycol (8.2), glycerinpropoxide triacrylate (9.2), trimethylolethocy triacrylate (9.1), and trimethylolpropane triacrylate (9.9). These monomers may be mixed or dispersed in a solution, and then mixed with a radical initiator to form a clear solution for use.

On the other hand, monomers having a high SP value used for compatibilizing the water-absorbing resin particles include acryloylmorpholine (10.9), vinylformamide (13.5), hydroxyethylacrylamide (10.6), acrylic acid (11.1), copolymers thereof, hydroxyacryloyloxypropyl methacrylate (11.7), pentaerythritol triacrlate (11.5), and pentaerythritol tetraacrylate (10.3).

These monomers may be used in combination with an acrylic acid comonomer or an oligomer having high plasticity, such as urethane acrylate, a polyether derivative, a polyester derivative, or the like.

The curable materials include ultraviolet-ray curable materials, electron-beam curable materials, thermosetting materials, and the like. The ultraviolet-ray curable materials are easy to be cured and the speed of curing is high, as compared with other types of materials, and thus are easy to handle. The electron-beam curable materials can be cured without using a polymerization initiator, and thus make it easy to control the coloring state of the layer after curing. The thermosetting materials can be cured without using a large-scale apparatus. In the invention, the curable materials are not restricted thereto, and materials that can be cured with moisture, oxygen, or the like may also be used.

The "ultraviolet-ray curable resins" that is obtained by curing an ultraviolet-ray curable material include, for example, an acrylic resin, a methacrylic resin, a urethane resin, a polyester resin, a maleimide resin, an epoxy resin, an oxetane resin, a polyether resin, and a polyvinyl ether resin.

Examples of the ultraviolet-ray curable material that serves a precursor for the ultraviolet-ray curable resin include an ultraviolet-ray curable monomer, an ultraviolet-ray curable macromer, an ultraviolet-ray curable oligomer, and an ultraviolet-ray curable prepolymer.

The ultraviolet-ray curable material preferably contains a hetero atom in the structure thereof. For example, the ultraviolet-ray curable material preferably has a polyether unit, a cyclic unit, an alkylene oxide unit having hydrophilicity, an alkyl chain unit or the like, containing N, S, O, Si or the like, more preferably N, S or O. The ultraviolet-ray material may contain a single kind of hetero atom, or may contain two or more kinds thereof.

Further, the ultraviolet-ray curable material may contain one or more monomer units having a reactive group, such as an acrylic unit, a methacrylic unit, an ether-acrylic unit, or a combination thereof.

Further, the image recording composition 12A may contain an ultraviolet-ray polymerization initiator that promotes ultraviolet-ray curing reaction. In order to promote the polymerization reaction, the image recording composition 12A may further contain a reaction aid, a polymerization promoter, or the like.

The ultraviolet-ray curable monomers include, for example, radical curable materials such as an acrylic ester of alcohols, polyhydric alcohols and amino alcohols, a methacrylic acid ester of alcohols and polyhydric alcohols, an acrylic aliphatic amide, an acrylic alicyclic amide, and an acrylic aromatic amide; cationic curable materials such as an epoxy monomer, an oxetane monomer, and a vinylether monomer. The ultraviolet-ray curable macromers, the ultraviolet-ray curable oligomers, and the ultraviolet-ray curable prepolymers include those prepared by polymerizing these monomers at a certain polymerization degree, and radical curable materials such as an epoxy acrylate, a urethane acrylate, a polyester acrylate, a polyether acrylate, a urethane methacrylate and a polyester methacrylate formed by adding an acryloyl group or a methacryloyl group to an epoxy, urethane, polyester or polyether skeleton.

When the curing reaction progresses through a radical reaction, ultraviolet-ray polymerization initiators that can be used include, for example, benzophenone, thioxanthone-type initiators, benzyl dimethyl ketal, an α-hydroxyketone, an α-hydroxy alkylphenone, an α-aminoketone, an α-amino alkylphenone, a monoacylphosphine oxide, a bisacylphosphine oxide, hydroxybenzophenone, aminobenzophenone, titanocene-type initiators, oxime-ester-type initiators, oxyphenylacetate-type initiators, and the like.

Further, when the curing reaction progresses through a cationic reaction, the ultraviolet-ray polymerization initiators that can be used include, for example, an aryl sulfonium salt, an aryl diazonium salt, a diaryl iodonium salt, a triaryl sulfonium salt, an allene-ion complex derivative, a triazine-type initiator, and the like.

The "electron-beam curable resins" obtained by curing the electron-beam curable material include, for example, an acrylic resin, a methacrylic resin, a urethane resin, a polyester resin, a polyether resin, a silicone resin, and the like. Examples of the ultraviolet-ray curable material that serve as a precursor for the ultraviolet-ray curable resins include an electron-beam curable monomer, an electron-beam curable macromer, an electron-beam curable oligomer, and an electron-beam curable prepolymer.

The aforementioned electron-beam curable materials preferably contain a hetero atom in the structure thereof, and examples of the preferable hetero atoms are the same as those described in the ultraviolet-ray curable material. Further, the electro-beam curable materials preferably has two or more reactive groups such as an acrylic group, a methacrylic group, a vinyl group, an acetylene group, or the like.

Examples of the electron-beam curable monomers, electron-beam curable macromers, electron-beam curable oligomers, and electron-beam curable prepolymers include materials similar to those described in the ultraviolet-ray curable materials.

The "thermosetting resins" obtained by curing the thermosetting material include an epoxy resin, a polyester resin, a phenol resin, a melamine resin, a urea resin, an alkyd resin, and the like.

Examples of the thermosetting materials that serve as a precursor for the thermosetting resin include thermosetting monomers, thermosetting macromers, thermosetting oligomers and thermosetting prepolymers.

The thermosetting materials preferably contain a hetero atom in the structure thereof, and examples of the preferable hetero atoms are the same as those described in the ultraviolet-ray curable material. Further, the electro-beam curable material preferably has a reactive group, similarly to the ultraviolet-ray curable materials.

Examples of the thermosetting monomers include phenol, formaldehyde, bisphenol A, epichlorohydrin, cyanuric acid amide, urea, polyalcohols such as glycerin, and acids such as phthalic anhydride, maleic anhydride and adipic acid. The thermosetting macromers, thermosetting oligomers and thermosetting prepolymers include those obtained by polymerizing the aforementioned monomers to a predetermined polymerization degree, an epoxy prepolymer, a polyester prepolymer, and the like. A curing agent may be added upon conducting the polymerization.

The image recording composition 12A may include a thermal polymerization initiator, including acids such as protic acid/Lewis acid, an alkali catalyst, a metal catalyst, and the like.

As mentioned above, the curable material is not restricted as long as the material is cured (for example, as a result of the progress of polymerization reaction) by an external energy such as ultraviolet rays, electron beams, or heat, and has an SP value satisfying the above range. When the material is cured through the progress of polymerization, it is preferable that the monomer or the like to be used has an excellent compatibility with a curing agent.

In view of increasing the speed of the image recording, curable materials having a high curing rate (for example, materials having a high polymerization reaction rate) are desirable. Examples of such curable materials include radiation curable materials (such as the above-mentioned ultraviolet-ray curable materials and electron-beam curable materials).

In view of improving the wetting property to the intermediate transfer member or the like, the curable material may be modified with silicon, fluorine, or the like. Further, in consideration of the curing rate and curing degree, the curable material preferably contains a polyfunctional prepolymer.

From the viewpoint of forming an image with high fineness, the curable material desirably has a small rate of contraction due to curing reaction. Further, in view of suppressing contraction due to curing reaction, it is preferable that the plasticity of the curable material is not too high. The viscosity of the curable material is desirably 5 mPa·s or more.

The amount of the curable material is preferably from 5% by weight to 90% by weight, more preferably from 10% by weight to 60% by weight, with respect to the total solid content of the image recording composition 12A.

Next, the nonionic surfactant contained in the image recording composition 12A will be explained.

The nonionic surfactant preferably has an HLB value of from 8 or about 8 to 18 or about 18, more preferably from 8 to 15, and particularly preferably from 8 to 12.

The degree of activity of a surfactant can be represented by an HLB (Hydrophile-Lipophile Balance) value, by which whether the surfactant is oil-in-water (o/w) type or water-in-oil (w/o) type can be determined. In the case of a w/o type surfactant, in which that water is dispersed in the form of fine particles in a continuous oil phase, the degree of HLB value may be from 3.5 to 6.0. In the invention, a nonionic surfactant may have an HLB value of from 8 to 18 for use in a resin film forming agent in which water-absorbing resin particles are dispersed in a resin base and an oil-soluble medium functions as a continuous phase.

The HLB value of a surfactant can be regulated by controlling the length, molecular weight, or modification degree of alkyl chain or polyether chain. The surfactant is adsorbed to an interface of water and particles to prevent secondary aggregation of the particles, thereby contributing to uniformly disperse the particles, improve the liquid absorbing property of ink, and bridge the ink component among the particles. Consequently, the surfactant contributes to dispersion of ink droplets. An oil-in-water-type emulsion, in which ink components including water is dispersed in an oily resin medium, serves as a medium.

The HLB value of the nonionic surfactant may be from 8 to 18 when the balance of hydrophilicity and hydrophobicity of an emulsifier is o/w type. On the other hand, the HLB value of the nonionic surfactant may be from 3.5 to 6 in an aqueous w/o-type medium to form an emulsion.

Examples of the nonionic surfactants that may be used in the invention include alkylethers, alkyl-allyethers, thioethers, esters, amides, polyhydric alcohols, and aminoalcohols.

Among these, surfactants having a polypropyleneoxide unit (PPG) and a polyethyleneoxide unit (PEG) are preferable. Specific examples thereof include a polyoxyethylene-propylene copolymer type-nonionic surfactant, sorbitan fatty acid ester, polyoxylauryl amine, polyoxyethylene stearyl amine, dialkyl sulfosuccinate, and a blend thereof.

The content of the nonionic surfactant with respect to the image recording composition may be from 0.01% by weight to 20% by weight, more preferably from 0.2% by weight to 6% by weight.

Next, the water-absorbing resin particles will be described in details.

The material for the water-absorbing resin particles is not restricted, as long as the material absorbs an aqueous medium.

The term "absorbs an aqueous medium" refers to a state that the amount of water absorption is 100 ml/100 g or more.

The "amount of water absorption" refers to the amount of an aqueous medium absorbed by 100 g of the material (ml), and is measured in accordance with the following process.

Specifically, the water-absorbing resin particles are put in an aqueous phase until water permeates the whole sample particles, and then the sample particles are immediately taken out from the aqueous phase and left on a mesh for five minutes. Thereafter, the weight of the sample particles is measured and the amount of the water absorption is calculated. A method as stipulated in JIS K 5101-13-1 is also applicable.

The amount of water absorption of the water-absorbing resin particles with respect to an aqueous medium may be, for example, 200 ml/100 g or more.

The volume average particle diameter (volume average primary particle diameter) of the water-absorbing resin particles may be from 0.5 μm to 5.0 μm, more preferably from 0.5 μm to 3.0 μm.

Specific examples of the material for the water-absorbing resin particles include polyacrylic acid and a salt thereof, polymethacrylic acid and a salt thereof, a copolymer of (meth)acrylic acid ester-(meth)acrylic acid or a salt thereof, a copolymer of styrene-(meth)acrylic acid or a salt thereof, a copolymer formed from an alcohol having an aliphatic group or an aromatic-substituted group and a structure of styrene-(meth)acrylic acid-carboxylic acid or a salt thereof and an ester obtained from (meth)acrylic acid, a copolymer formed from an alcohol having an aliphatic group or an aromatic-substituted group and a structure of (meth)acrylic acid ester-carboxylic acid or a salt thereof and an ester obtained from (meth)acrylic acid, a copolymer of ethylene-(meth)acrylic acid, a copolymer of butadiene-(meth)acrylic acid ester-carbocylic acid or a salt thereof, a copolymer formed from an alcohol having an aliphatic group or an aromatic-substituted group and a structure of butadiene-(meth)acrylic acid ester-carboxylic acid or a salt thereof and an ester obtained from (meth)acrylic acid, a copolymer of polymaleic acid and a salt thereof, a copolymer of styrene-maleic acid or a salt thereof, a sulfonic-acid-modified product of the above resins, and a phosphoric-acid-modified product of the above resins.

Among these, polyacrylic acid and a salt thereof, a copolymer of styrene-(meth)acrylic acid or a salt thereof, a copolymer of styrene-(meth)acrylic acid ester-(meth)acrylic acid or a salt thereof, a copolymer formed from an alcohol having an aliphatic group or an aromatic-substituted group and a structure of styrene-(meth)acrylic acid ester-carboxylic acid or a salt thereof and an ester obtained from (meth)acrylic acid, and a copolymer of (meth)acrylic acid ester-(meth)acrylic acid or a salt thereof are preferable. These resins may be crosslinked or may not be crosslinked.

The water-absorbing resin particles may be produced by suspension-polymerization, emulsion-polymerization, solution-polymerization, or the like. The obtained water-absorbing resin particles may be used without modification or may be subjected to pulverization using a ball mill or a sand mill, frost-pulverization, or re-sedimentation using a solvent.

The content of the water-absorbing resin particles with respect to the total amount of image recording composition 12A is preferably from 5% by weight to 80% by weight, more preferably from 20% by weight to 40% by weight.

The image recording composition 12A may further contain a component other than the curable material and the water-absorbing resin particles (hereinafter, sometimes referred to as "other fixing component") in order to fix an ink component on or within the curable layer 12B.

In the present exemplary embodiment, the water-absorbing resin particles and other fixing component are mixed in the image recording composition 12A in advance. However, it is also possible to prepare a separate solution each containing the water-absorbing resin particles and other fixing component, and eject the solution to the curable layer 12B from an ejector. The ejection of a solution containing water-absorbing resin particles or other fixing component onto the curable layer 12B is preferably performed prior to ejecting ink droplets 14A onto the curable layer 12B from the inkjet recording head 14.

Examples of the other fixing component include a component that adsorbs an ink component (such as a colorant) and a component that aggregates the ink component (such as a colorant) or increases the viscosity thereof, but are not limited thereto.

The components that adsorb an ink component (such as a colorant) include silica, alumina, and zeolite. The content of the component may be from 0 to 30% by weight with respect to the total amount of the image recording composition.

The components that aggregate the ink component (such as a colorant) or increase the viscosity thereof include inorganic electrolytes, organic acids, inorganic acids, and organic amines.

Examples of the inorganic electrolytes include a salt of an alkaline metal ion such as a lithium ion, a sodium ion, a potassium ion, or a polyvalent metal ion such as an aluminum ion, a barium ion, a calcium ion, a copper ion, an iron ion, a magnesium ion, a manganese ion, a nickel ion, a tin ion, a titanium ion, and a zinc ion; and an inorganic acid such as hydrochloric acid, bromic acid, hydriodic acid, sulfuric acid, nitric acid, phosphoric acid and thiocyanic acid, an organic carboxylic acid such as acetic acid, oxalic acid, lactic acid, fumaric acid, citric acid, salicylic acid and benzoic acid, and an organic sulfonic acid.

Specific examples of the above inorganic electrolytes include an alkaline metal salt such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate; and a polyvalent metal salt such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Specific examples of the organic acids include arginine acid, citric acid, glycine, glutamic acid, succinic acid, tartaric acid, cysteine, oxalic acid, fumaric acid, phthalic acid, maleic acid, malonic acid, lycine, malic acid, and a compound represented by the following Formula (1) and derivatives thereof.

Formula (1)

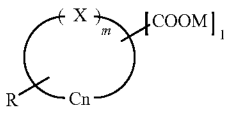

In Formula (1), X represents O, CO, NH, $NR_1$, S or $SO_2$, preferably CO, NH, $NR_1$ or O, and more preferably CO, NH or O, where $R_1$ is an alkyl group, preferably $CH_3$, $C_2H_5$ or $C_2H_4OH$; R represents an alkyl group, preferably $CH_3$, $C_2H_5$ or $C_2H_4OH$, and R may be included in Formula 1 or may not be included; M represents a hydrogen atom, an alkali metal or an amine and is preferably H, Li, Na, K, monoethanol amine, diethanol amine, triethanol amine or the like, more preferably H, Na or K, and further preferably a hydrogen atom; n represents an integer of from 3 to 7 and is preferably an integer with which the heterocyclic ring is a six-membered or five-membered ring, and more preferably an integer with which the heterocyclic ring is a five-membered ring; m represents 1 or 2; and l represents an integer of from 1 to 5. The compound represented by Formula (1) may be a saturated ring or an unsaturated ring, as long as the compound forms a heterocyclic structure.

Examples of the compounds represented by Formula (1) include compounds having a structure of furan, pyrrole, pyrro line, pyrrolidone, pyrone, pyrrole, thiophene, indole, pyridine or quinoline, and further including a carboxyl group as a functional group. Specific examples of the compounds include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

Preferable examples of the organic acids include citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or derivatives or salts thereof. The organic acid is more preferably pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or a derivative or salt thereof. The organic acid is further preferably pyrrolidone carboxylic acid, pyrone carboxylic acid, furan carboxylic acid, coumaric acid, or a derivative or salt thereof.

An organic amine compound may be any of a primary amine, secondary amine, tertiary amine, quaternary amine and a salt thereof. Specific examples of the organic amine compounds include a tetraalkyl ammonium, alkylamine, benzalconium, alkylpyridium, imidazolium, polyamine and a derivative or a salt thereof, such as amyl amine, butyl amine, propanol amine, propyl amine, ethanol amine, ethyl ethanol amine, 2-ethyl hexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-ethylhexyl amine, diethylene triamine, diphenyl amine, dibutyl amine, dipropyl amine, dihexyl amine, dipentyl amine, 3-(dimethylamino)propyl amine, dimethyl ethyl amine, dimethyl ethylene diamine, dimethyl octyl amine, 1,3-dimethyl butyl amine, dimethyl-1,3-propane diamine, dimethyl hexyl amine, amino-butanol, amino-propanol, amino-propane diol, N-acetylamino ethanol, 2-(2-aminoethyl amino)ethanol, 2-amino-2-ethyl-1,3-propane diol, 2-(2-aminoethoxy)ethanol, 2-(3,4-dimethoxyphenyl) ethyl amine, cetyl amine, triisopropanol amine, triisopentyl amine, triethanol amine, trioctyl amine, trityl amine, bis(2-aminoethyl)1,3-propane diamine, bis(3-aminopropyl) ethylene diamine, bis(3-aminopropyl)1,3-propane diamine, bis(3-aminopropyl)methyl amine, bis(2-ethylhexyl)amine, bis(trimethylsilyl)amine, butyl amine, butyl isopropyl amine, propane diamine, propyl diamine, hexyl amine, pentyl amine, 2-methyl-cyclohexyl amine, methyl-propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxy ethyl stearyl amine, 2-heptadecenyl-hydroxyethyl imidazoline, lauryl dimethyl benzyl ammonium chloride, cetyl pyridinium chloride, stearamid methyl pyridium chloride, a diallyl dimethyl ammonium chloride polymer, a diallyl amine polymer, and a monoallyl amine polymer.

Among these organic amine compounds, triethanol amine, triisopropanol amine, 2-amino-2-ethyl-1,3-propanediol, ethanol amine, propane diamine, and propyl amine are more preferable.

Among the above aggregating agents, polyvalent metal salts such as $Ca(NO_3)$, $Mg(NO_3)$, $Al(OH_3)$, a polyaluminum chloride, and the like, are preferably used.

The aggregating agent may be used alone or in combination of two or more kinds thereof. The content of the aggregating agent is preferably from 0.01% by weight to 30% by weight.

Further, the image recording composition 12A may contain water or an organic solvent that dissolves or disperses a main component that contributes to the curing reaction (such as a monomer, macromer, oligomer, prepolymer, polymerization initiator, or nonionic surfactant). However, the total content of the main component and the water-absorbing resin particles may be, for example, in the range of 30% by weight or more, preferably 60% by weight or more, and more preferably 90% by weight or more.

Further, the image recording composition 12A may contain a coloring material of various kinds for the purpose of controlling the color of the cured layer.

The image recording composition 12A preferably contains a thermoplastic resin for the purpose of regulating the viscosity thereof. The thermoplastic resins include acrylic resins, polyester resins, polycarbonate resins, polyurethane resins, polystyrene, polyether resins, polyether resins, polyethylene resins, polypropylene resins, copolymers of polystyrene and an acrylic monomer, and a blend thereof.

The viscosity of the image recording composition 12A may be from 5 mPa·s to 30,000 mPa·s, preferably from 100 mPa·s to 3,000 mPa·s. Moreover, the viscosity of the image recording composition 12A is preferably larger than the viscosity of the ink.

The above viscosity is measured by using a viscometer TV-22 (trade name, manufactured by Toki Sangyo Co., Ltd.) at a shear rate of from 2.25 to 750 (l/s) at 15° C., and the viscosity as described in the present specification is measured in accordance with the same process at a shear rate of 10 $s^{-1}$.

The image recording composition 12A is preferably low-volatile or non-volatile at ordinary temperature (25° C.). Here, being low-volatile refers to that the boiling point is 200° C. or more at atmospheric pressure. Further, being non-volatile refers to that the boiling point is 300° C. or more at atmospheric pressure. The same will apply to the following description.

In the following, inks that are applicable for the present exemplary embodiments will be described.

The ink used in the invention is an aqueous ink containing an aqueous medium. UV-curable type inks are also usable.

Aqueous inks include an ink containing an aqueous dye or pigment, as a recording material, dispersed or dissolved in an aqueous medium.

As the recording material, a coloring material is typically used. Although both dyes and pigments are usable, pigments are preferred. Both organic pigments and inorganic pigments can be used as the pigment, and black pigments include carbon black pigments such as furnace black, lamp black, acetylene black, channel black, and the like. Other than pigments of black and three primary colors of cyan, magenta and yellow, pigments of a specific color such as red, green, blue, brown and white, pigments having a metallic luster such as gold and silver, extender pigments having no color or a pale color, may be used. Pigments that are newly synthesized for use in the present exemplary embodiments may also be used.

Further, particles formed by adhering a dye or a pigment to the surface of a core formed from silica, alumina, or polymer beads, insoluble laked products of a dye, a colored emulsion, a colored latex, or the like, may also be used as the pigment.

Specific examples of black pigments include RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080 and RAVEN 1060 (trade names; manufactured by Columbian Carbon); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 and MONARCH 1400 (trade names; manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A and SPECIAL BLACK 4 (trade names; manufactured by Degussa); and No. 25, No. 33, No. 40, No. 47, No. 52, No. 900, No. 2300, MCF-88, MA 600, MA 7, MA 8 and MA 100 (trade names; manufactured by Mitsubishi Chemical Corporation), but are not limited thereto.

Specific examples of cyan color pigments include C.I. PIGMENT BLUE-1, -2, -3, -15, -15:1, -15:2, -15:3, -15:4, -16, -22 and -60, but are not limited thereto.

Specific examples of magenta color pigments include C.I. PIGMENT RED-5, -7, -12, -48, -48:1, -57, -112, -122, -123, -146, -168, -177, -184, -202, and C.I. PIGMENT VIOLET-19, but are not limited thereto.

Specific examples of yellow color pigments include C.I. PIGMENT YELLOW-1, -2, -3, -12, -13, -14, -16, -17, -73, -74, -75, -83, -93, -95, -97, -98, -114, -128, -129, -138, -151, -154 and -180, but are not limited thereto.

When a pigment is used as the coloring material, it is desirable to use a dispersing agent in combination. The dispersing agents that can be used in the invention include a polymeric dispersant, an anionic surfactant, a cationic surfactant, an amphoteric surfactant, and a nonionic surfactant.

As the polymeric dispersant, polymers having both a hydrophilic structural moiety and a hydrophobic structural moiety are suitably used. The polymer having both a hydrophilic structural moiety and a hydrophobic structural moiety may be either a condensation-type polymer or an addition-type polymer. The condensation-type polymers include known polyester-type dispersants. The addition-type polymers include an addition polymer of a monomer having an α, β-ethylenic unsaturated group. The desired polymeric dispersant may be obtained by copolymerizing a monomer having an α, β-ethylenic unsaturated group and a hydrophilic group with a monomer having an α, β-ethylenic unsaturated group and a hydrophobic group. Moreover, a homopolymer of a monomer having a hydrophilic group and an α, β-ethylenic unsaturated group may also be used.

Monomers having an α, β-ethylenic unsaturated group and a hydrophilic group include monomers having a carboxyl group, a sulfonic acid group, a hydroxyl group, a phosphoric group, or the like. Specific examples thereof include acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylamide, methacryloxy ethyl phosphate, bismethacryloxy ethyl phosphate, methacryloxy ethyl phenyl acid phosphate, ethylene glycol dimethacrylate, and diethylene glycol dimethacrylate.

Monomers having an α, β-ethylenic unsaturated group and a hydrophobic group include styrene, styrene derivatives such as a-methyl styrene and vinyltoluene, vinyl cyclohexane, vinyl naphthalene, vinyl naphthalene derivatives, an alkyl acrylate, an alkyl methacrylate, phenyl methacrylate, an cycloalkyl methacrylate, an alkyl crotonate, an dialkyl itaconate, and an dialkyl maleate.

Preferable examples of copolymers used as a polymeric dispersant include a styrene-styrene sulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an alkylacrylate-acrylic acid copolymer, an alkylmethacrylate-methacrylic acid copolymer, a styrene-alkylmethacrylate-methacrylic acid copolymer, a styrene-alkylacrylate-acrylic acid copolymer, a styrene-phenyl methacrylate-methacrylic acid copolymer, and a styrene-cyclohexylmethacrylate-methacrylic acid copolymer. Moreover, monomers having a polyoxyethylene group or a hydroxyl group may be copolymerized with these polymers.

The above polymeric dispersants may have a weight average molecular weight of from 2,000 to 50,000, for example.

These pigment dispersants may be used singly or in combination of two or more kinds. The addition amount of the dispersants may greatly vary depending on the kind of the pigment, but is commonly from 0.1% by weight to 100% by weight with respect to the amount of the pigment.

A self-dispersible pigment that can dissolve in water by itself may also be used as a coloring material. The self-dispersible pigment that can dissolve in water by itself refers to a pigment having many groups that are soluble to water on the surface of the pigment, which can disperse in water without the presence of a polymeric dispersant. Specifically, the self-dispersible pigment can be obtained by subjecting a common pigment to a surface modifying treatment such as an acid/base treatment, a coupling agent treatment, a polymer graft treatment, a plasma treatment, or an oxidation/reduction treatment.

Further, the self-dispersible pigments in water include, other than the pigments that has been subjected to a surface modifying treatment as described above, CAB-O-JET-200, CAB-O-JET-300, IJX-157, IJX-253, IJX-266, IJX-273, IJX-444, IJX-55, and CABOT 260 (trade names; manufactured by Cabot Corporation), and MICROJET BLACK CW-1 and CW-2 (trade names; manufactured by Orient Chemical Industries, Ltd.).

The self-dispersible pigment preferably has at least a sulfonic acid, a sulfonic acid salt, a carboxylic acid or a carboxylic acid salt on the surface of the pigment, as a functional group. The self-dispersible pigment is more preferably a pigment having at least a carboxylic acid or a carboxylic acid salt on the surface of the pigment as a functional group.

Further, pigments covered with a resin may also be used. Such pigments are called a microcapsule pigment and include commercially available microcapsule pigments manufactured by DIC Corporation, Toyo Ink Manufacturing Co., Ltd., or the like, and microcapsule pigments experimentally prepared for the present exemplary embodiment may also be used.

Moreover, resin dispersion-type pigments prepared by physically adsorbing or chemically bonding the aforementioned polymer material to the above pigments may also be used.

The recording materials include dyes such as hydrophilic anionic dyes, direct dyes, cationic dyes, reactive dyes and polymeric dyes, and oil-soluble dyes; wax powder, resin powder or emulsions colored with a dye; fluorescent dyes and fluorescent pigments, infrared absorbing agents, and ultraviolet absorbing agents; magnetic substances, represented by ferromagnetic substances such as ferrite and magnetite; semiconductors or photocatalysts represented by titanium oxide and zinc oxide; and other organic and inorganic electronic material particles.

The content (concentration) of the recording material is, for example, in the range of from 5% by weight to 30% by weight with respect to the amount of the ink.

The volume average particle diameter of the recording material is, for example, in the range of from 10 nm to 1,000 nm.

The volume average particle diameter of the recording material refers to the particle diameter of the recording material particles themselves, or when an additive such as a dispersant is adhered to the recording material particles, refers to the particle diameter of the recording material particles including the additive attached thereto. As a measuring device of the volume average particle diameter, Microtrac UPA particle size distribution analyzer 9340 (trade name; manufactured by Leeds & Northrup) may be used. The measurement is conducted by putting 4 ml of the ink in a measurement cell, and performing measurement in accordance with a predetermined measuring method. As the data to be input for the measurement, the viscosity of the ink is used as the viscosity, and the density of the recording material is used as the density of dispersed particles.

The aqueous media include water, preferably ion exchange water, ultra-pure water, distilled water, and ultrafiltration water. An water-soluble organic solvent may also used in combination with the aqueous medium, and examples there of include polyhydric alcohols, polyhydric alcohol derivatives, nitrogen-containing solvents, alcohols, sulfur-containing solvents, and the like.

Specific examples of the water-soluble organic solvent include polyhydric alcohols such as ethylene glycol, diethylene glycol, propylene glycol, butylene glycol, triethylene glycol, 1,5-pentanediol, 1,2-hexanediol, 1,2,6-hexanetriol, glycerin and trimethylol propane; sugar alcohols such as xylitol; and saccharides such as xylose, glucose, and galactose.

The polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerol.

The nitrogen-containing solvents include pyrrolidone, N-methyl-2-pyrrolidone, cyclohexyl pyrrolidone and triethanol amine.

The alcohols include ethanol, isopropyl alcohol, butyl alcohol and benzyl alcohol.

The sulfur-containing solvents include thiodiethanol, thiodiglycerol, sulfolane and dimethyl sulfoxide.

The water-soluble organic solvent may also be propylene carbonate, ethylene carbonate, or the like.

The water-soluble organic solvent may be used singly or in combination of two or more kinds. The content of the water-soluble organic solvent is, for example, in the range of from 1% by weight to 70% by weight.

The ink may also contain other additive(s) as necessary, such as a surfactant.

The surfactants include various kinds of anionic surfactants, nonionic surfactants, cationic surfactants and amphoteric surfactants. Among these, anionic surfactants and nonionic surfactants are preferably used.

Examples of the anionic surfactants include an alkyl benzene sulfonic acid salt, an alkyl phenyl sulfonic acid salt, an alkyl naphthalene sulfonic acid salt, a higher fatty acid salt, a sulfuric ester salt of a higher fatty acid ester, a sulfonic acid salt of a higher fatty acid ester, a sulfuric ester salt of a higher alcohol ether, a sulfonic acid salt of a higher alcohol ether, a higher alkyl sulfosuccinic acid salt, a polyoxyethylene alkyl ether carboxylate, a polyoxyethylene alkyl ether sulfate, an alkyl phosphate, and a polyoxyethylene alkyl ether phosphate. Among these, dodecyl benzene sulfonate, isopropylnaphthalene sulfonate, monobutylphenyl phenol mono-sulfonate, monobutyl biphenyl sulfonate, and dibutylphenyl phenol disulfonate.

Examples of the nonionic surfactants include a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene sorbitol fatty acid ester, a glycerin fatty acid ester, a polyoxyethylene glycerin fatty acid ester, a polyglycerin fatty acid ester, a sucrose fatty acid ester, a polyoxyethylene alkylamine, a polyoxyethylene fatty acid amide, an alkyl alkanol amide, a polyethylene glycol polypropylene glycol block copolymer, acetylene glycol, and polyoxyethylene-added acetylene glycol. Among these, a polyoxyethylene nonylphenyl ether, a polyoxyethylene octylphenyl ether, a polyoxyethylene dodecylphenyl ether, a polyoxyethylene alkyl ether, a polyoxyethylene fatty acid ester, a sorbitan fatty acid ester, a polyoxyethylene sorbitan fatty acid ester, a fatty acid alkylol amide, a polyethylene glycol polypropylene glycol block copolymer, acetylene glycol, and polyoxyethylene-added acetylene glycol are preferable.

In addition, silicone-based surfactants such as a polysiloxane oxyethylene adduct, fluorine-based surfactants such as a perfluoroalkyl carboxylate, a perfluoroalkyl sulfonate, and an oxyethylene perfluoroalkyl ether, and biosurfactants such as spiculisporic acid, rhamnolipid, lysolecithin, may also be used.

The surfactant may be used singly or in combination of two or more kinds. Further, in consideration of the solubility, for example, the hydrophile-lipophile balance (HLB) of the surfactant may be in the range of from 3 to 20.

The addition amount of these surfactants may be, for example, in the range of from 0.001% by weight to 5% by weight, preferably in the range of from 0.01% by weight to 3% by weight, with respect to the amount of the ink.

In addition, the ink may include a penetrant for the purpose of adjusting the permeability of the ink; polyethyleneimine, polyamines, polyvinyl pyrrolidone, polyethylene glycol, ethylcellulose, carboxymethyl cellulose, and the like, for the purpose of controlling characteristics of the ink such as ink-ejection properties; and alkali metal compounds such as potassium hydroxide, sodium hydroxide and lithium hydroxide for the purpose of adjusting the electroconductivity and the pH value of the ink. Further, a pH buffer, an antioxidant, an antifungal agent, a viscosity-controlling agent, an electric conductor, an ultraviolet absorber, a chelating agent, may also be added to the ink, if necessary.

In the following, characteristics of the ink will be explained.

The surface tension of the ink may be, for example, in the range of from 20 mN/m to 45 mN/m. Here, the value of the surface tension refers to that obtained by using a Wilhelmy surface tensiometer (manufactured by Kyowa Interface Science Co., Ltd.) under the conditions of 23° C. and 55% RH.

The viscosity of the ink may be, for example, in the range of from 1.5 mPa·s to 30 mPa·s, preferably in the range of from 1.5 mPa·s to 20 mPa·s. The viscosity of the ink is preferably lower than the viscosity of the image recording composition. Here, the value of the viscosity refers to that obtained by using a visocometer, RHEOMAT 115 (trade name; manufactured by Contraves AG), under the conditions of a measurement temperature of 23° C. and a shear rate of 1400 $s^{-1}$.

The ink in the invention is not limited to the above composition. Further, for example, the ink may contain a functional material such as a liquid crystal material and an electronic material, other than the recording material.

Moreover, in each case of the above exemplary embodiments of the invention, a full color image is recorded on a recording medium by selectively ejecting ink droplets of black, yellow, magenta and cyan from respective inkjet recording heads, based on the image data. However, the exemplary embodiments of the invention are not limited to the recording of characters or images onto a recording medium, and are generally applicable to any kind of liquid-ejecting (liquid-jetting) devices for industrial use.

EXAMPLES

Hereinafter, the present invention will be explained in further details with reference to examples. However, the invention is not restricted to these examples.

Example 1

With the use of a recording apparatus having a similar configuration to the above-described second exemplary embodiment (see FIG. 2), a curable layer is formed by supplying an image recording composition onto an intermediate transfer belt from a supply unit, and ink of each color is ejected onto the curable layer from respective recording heads. Subsequently, printing is performed after transferring the curable layer onto a recording medium and curing the transferred curable layer by supplying a stimulus from a stimulus application unit. The conditions for the above process are as follows.

- Intermediate transfer belt: 0.1 mm in thickness; 350 mm in width; formed by coating an endless belt made of polyimide having an outer diameter of 168 mm with a fluorine-based resin (process speed: 400 mm/s)
- Supply unit: Eriksen coater (coating gap of the curable layer: 12 μm, thickness of the curable layer: 18 μm)
- Recording head: piezo-type recording head (resolution: 600 dpi (dpi: the number of dots per inch, hereinafter the same will apply)
- Transfer unit (pressure roll): formed by covering a steel pipe with a diameter of 30 mm with a fluorine-based resin (pressing force against the intermediate transfer belt: 1 kgf)
- Stimulus application unit: 160 W halogen lamp, 5 seconds
- Recording medium: art paper (OK Kinfuji (trade name), manufactured by Oji Paper Co., Ltd.))

The image recording composition and the inks of respective colors are prepared in accordance with the following processes.

| Image recording composition 1 | |
|---|---|
| Silicone-modified acrylic resin (HC 1102, trade name, manufactured by Momentive Performance Materials Inc., SP value: 8.0, curable material) | 60 parts by weight |
| Acryloyl morpholine (ACMO, manufactured by Kohjin Co., Ltd., SP value: 10.9, curable material) | 40 parts by weight |

The above materials are mixed, and crosslinked sulfonic-acid-modified sodium polyacrylate (AQUALIC cs7s, trade name, manufactured by Nippon Shokubai Co., Ltd., pulverized by a ball mill to have a median particle diameter of 6 μm, water-absorbing resin particles) is mixed therein so that the content of the water-absorbing resin particles with respect to the total amount of the mixture is 40% by weight. Futher, a polyoxyethylene-propylene copolymer type-nonionic surfactant (NEWPOL PE 64, trade name, manufactured by Sanyo Chemical Industries, Ltd., HLB value: 8) is mixed therein so that the content of the surfactant with respect to the total amount of the mixture is 2% by weight. Image recording composition 1 is thus obtained.

| Black Ink 1 | |
|---|---|
| Black pigment dispersion (pigment concentration: 15% by weight) | 40 parts by weight |
| Solvent (ISOPAR L, trade name, manufacture by Exxon Mobil Corporation) | 20 parts by weight |
| Ethyl oleate | 26 parts by weight |

To the above components are added ISOPAR G (trade name, manufactured by Exxon Mobil Corporation) and oleyl alcohol in a total amount of 5 parts by weight to adjust the viscosity to 6.5 mPa·s, and black ink 1 is thus obtained.

The black pigment dispersion is prepared by adding a dispersant (SOLSPERSE 13940, manufactured by The Lubrizol Corporation) to carbon black and dispersing the mixture in a solvent (ISOPAR L, trade name, manufactured by Exxon Mobil Corporation).

| Cyan Ink 1 | |
|---|---|
| Cyan pigment dispersion (pigment concentration: 10% by weight) | 50 parts by weight |
| Solvent (ISOPAR M, trade name, manufacture by Exxon Mobil Corporation) | 20 parts by weight |
| Soybean oil | 20 parts by weight |

To the above components are added ISOPAR G (trade name, manufactured by Exxon Mobil Corporation) and oleyl alcohol in a total amount of 8 parts by weight to adjust the viscosity to 7.5 mPa·s, and cyan ink 1 is thus obtained.

The cyan pigment dispersion is prepared by adding a dispersant (SOLSPERSE 16000, manufactured by The Lubrizol Corporation) to a phthalocyanine pigment and dispersing the mixture in a solvent (ISOPAR M, trade name, manufactured by Exxon Mobil Corporation).

| Magenta Ink 1 | |
|---|---|
| Magenta pigment dispersion (pigment concentration: 15% by weight) | 30 parts by weight |
| Solvent (ISOSOL, trade name, manufactured by Nippon Oil Corporation) | 12 parts by weight |
| Soybean oil | 15 parts by weight |
| Oleyl alcohol | 30 parts by weight |

To the above components are added ISOPAR G (trade name, manufactured by Exxon Mobil Corporation) and oleyl alcohol in a total amount of 10 parts by weight to adjust the viscosity to 8.8 mPa·s, and magenta ink 1 is thus obtained.

The magenta pigment dispersion is prepared by adding a dispersant (SOLSPERSE 34750, trade name, manufactured by The Lubrizol Corporation) to a quinacridone pigment and dispersing the mixture in a solvent (ISOPAR M, trade name, manufactured by Exxon Mobil Corporation).

| Yellow Ink 1 | |
|---|---|
| Yellow pigment dispersion (pigment concentration: 18% by weight) | 25 parts by weight |
| Solvent (ISOPAR M, trade name, manufacture by Exxon Mobil Corporation) | 40 parts by weight |
| Butyl oleate | 15 parts by weight |

To the above components are added ISOPAR G (trade name, manufactured by Exxon Mobil Corporation) and oleyl alcohol in a total amount of 5 parts by weight to adjust the viscosity to 6.7 mPa·s, and yellow ink 1 is thus obtained.

The yellow pigment dispersion is prepared by adding a dispersant (DISPERBYK-101, trade name, manufactured by BYK-Chemie GmbH) to Pigment Yellow 74 and dispersing the mixture in a solvent (ISOPAR G, trade name, manufactured by Exxon Mobil Corporation).

A curable layer having a thickness of 18 μm is formed by applying the above-prepared image recording composition 1 onto the aforementioned intermediate transfer belt by an Eriksen coater with a gap of 12 μm. Printing is performed by ejecting the above-prepared inks of four colors onto the curable layer using the above recording head (with a resolution of 600 dpi), respectively. Thereafter, the above art paper sheet is closely contacted to the intermediate transfer belt to transfer the curable layer to the art paper sheet using the pressure roller with a load of 1 kgf, and the curable layer is cured by irradiating with UV rays using the 160 W halogen lamp for five seconds, thereby forming an image.

Example 2

An image is formed in a similar manner to Example 1, except that HC1102 is changed to 70 parts by weight of a silicone-modified acrylic resin (HC1101, trade name, manufactured by Momentive Performance Materials Inc.); the amount of ACMO is changed to 30 parts by weight; and NEWPOL PE 64 is changed to the same amount of a polyoxyethylene-propylene copolymer type-nonionic surfactant (NEWPOL PE 62, trade name, manufactured by Sanyo Chemical Industries, Ltd., HLB value: 8). Further, the thickness of the curable layer is changed to 12 μm and the gap for the coating is changed to 7 μm.

Example 3

An image is formed in a similar manner to Example 1, except that ACMO is changed to the same amount of N,N-dimethylacrylamide (manufactured by Kohjin Corporation, SP value: 14.4). Further, the thickness of the curable layer is changed to 21 μm and the gap for the coating is changed to 12 μm.

Example 4

An image is formed in a similar manner to Example 1, except that ACMO is changed to the same amount of dipropyleneglycol diacrylate (manufactured by Shin-Nakamura Chemical Corporation). Further, the thickness of the curable layer is changed to 16 μm and the gap for the coating is changed to 7 μm.

Example 5

An image is formed in a similar manner to Example 1, except that ACMO is changed to the same amount of citric acid (manufactured by Wako Pure Chemical Industries, Ltd.). Further, the thickness of the curable layer is changed to 22 μm and the gap for the coating is changed to 12 μm.

Example 6

An image is formed in a similar manner to Example 1, except that ACMO is changed to the same amount of ethylene-oxide-modified trimethylolpropane triacrylate (manufactured by Shin-Nakamura Chemical Corporation). Further, the thickness of the curable layer is changed to 19 μm and the gap for the coating is changed to 12 μm.

Example 7

An image is formed in a similar manner to Example 1, except that NEWPOL PE 64 is changed to the same amount of polyoxyethylene stearyl amine (AMIET 105, trade name, manufactured by Kao Corporation). Further, the thickness of the curable layer is changed to 22 μm and the gap for the coating is changed to 12 μm.

Example 8

An image is formed in a similar manner to Example 1, except that NEWPOL PE 64 is changed to the same amount of polyoxyethylene lauryl amine (AMIET 102, trade name, manufactured by Kao Corporation). Further, the thickness of the curable layer is changed to 24 μm and the gap for the coating is changed to 12 μm.

Example 9

An image is formed in a similar manner to Example 1, except that ACMO is changed to the same amount of polyoxyethylene diacrylate (NK400, trade name, manufactured by Shin-Nakamura Chemical Corporation, molecular weight: 400), and NEWPOL PE 64 is changed to the same amount of polyoxyethylene alkyl amine (AMIET 302, trade name, manufactured by Kao Corporation). Further, the thickness of the curable layer is changed to 20 μm and the gap for the coating is changed to 12 μm.

Example 10

An image is formed in a similar manner to Example 1, except that ACMO is changed to the same amount of polyoxyethylene diacrylate (NK600, trade name, manufactured by Shin-Nakamura Chemical Corporation, molecular weight: 600), and NEWPOL PE 64 is changed to the same amount of polyoxyethylene alkyl amine (AMIET 105, trade name, manufactured by Kao Corporation). Further, the thickness of the curable layer is changed to 12 μm and the gap for the coating is changed to 25 μm.

Example 11

An image is formed in a similar manner to Example 1, except that ACMO is changed to the same amount of polyoxyethylene diacrylate (NK400 and NK200 (50% diluted), trade name, manufactured by Shin-Nakamura Chemical Corporation). Further, the thickness of the curable layer is changed to 18 μm and the gap for the coating is changed to 12 μm.

Example 12

An image is formed in a similar manner to Example 1, except that ACMO is changed to the same amount of dipropyleneglycol diacrylate (manufactured by Daicel Chemical Industries, Ltd.), and NEWPOL PE 64 is changed to the same amount of NEWPOL PE 61 (trade name, manufactured by Sanyo Chemical Industries, Ltd.). Further, the thickness of the curable layer is changed to 17 μm and the gap for the coating is changed to 12 μm.

Example 13

An image is formed in a similar manner to Example 1, except that ACMO is changed to the same amount of dipropyleneglycol diacrylate (manufactured by Daicel Chemical Industries, Ltd.), and NEWPOL PE 64 is changed to the same amount of NEWPOL PE 62 (trade name, manufactured by Sanyo Chemical Industries, Ltd.). Further, the thickness of the curable layer is changed to 17 μm and the gap for the coating is changed to 12 μm.

Comparative Example 1

An image is formed in a similar manner to Example 1, except that NEWPOL PE 64 is changed to the same amount of SOLSPERSE 71000 (trade name, basic anionic surfactant, manufactured by The Lubrizol Corporation). Further, the thickness of the curable layer is changed to 29 μm and the gap for the coating is changed to 12 μm.

Comparative Example 2

An image is formed in a similar manner to Example 1, except that no surfactant is used. Further, the thickness of the curable layer is changed to 22 μm and the gap for the coating is changed to 12 μm.

Comparative Example 3

An image is formed in a similar manner to Example 1, except that NEWPOL PE 64 is changed to SANSEPARA 100 (an anionic surfactant, dialkyl sulfosuccinate having an alkyl group as a hydrophobic group and a sulfonic group as a hydrophilic group, manufactured by Sanyo Chemical Industries, Ltd.). Further, the thickness of the curable layer is changed to 16 μm and the gap for the coating is changed to 7 μm.

Comparative Example 4

An image is formed in a similar manner to Example 1, except that ACNO is changed to tartaric acid (manufactured by Wako Pure Chemical Industries, Ltd., SP value: 19.7). Further, the thickness of the curable layer is changed to 13 μm and the gap for the coating is changed to 7 μm.

TABLE 1

| | SP value of Curable Material | Surfactant | HLB value of Surfactant |
|---|---|---|---|
| Example 1 | 10.9 | Nonionic | 8 |
| Example 2 | 10.9 | Nonionic | 8 |
| Example 3 | 14.4 | Nonionic | 8 |
| Example 4 | 9.5 | Nonionic | 8 |
| Example 5 | 16.5 | Nonionic | 8 |
| Example 6 | 9.1 | Nonionic | 8 |
| Example 7 | 10.9 | Nonionic | 9.8 |
| Example 8 | 10.9 | Nonionic | 6.3 |
| Example 9 | 9.7 | Nonionic | 9.8 |
| Example 10 | 9.7 | Nonionic | 6.3 |
| Example 11 | 9.7 | Nonionic | 2 |
| Example 12 | 9.5 | Nonionic | 4 |
| Example 13 | 9.5 | Nonionic | 2 |
| Comp. Example 1 | 10.9 | Anionic | 4.7 |
| Comp. Example 2 | 10.9 | — | — |
| Comp. Example 3 | 10.9 | Anionic | 6.3 |
| Comp. Example 4 | 19.7 | Anionic | 8 |

Evaluation (Measurement of Surface Glossiness G75°)

The surface glossiness of the image (after being cured) is measured by a digital high-precision glossmeter (manufactured by Murakami Color Research Laboratory Co., Ltd.) at an incident angle of 75°. The results are shown in Table 2.

(Measurement of Surface Roughness Rz and Maximum Roughness Rmax)

The surface roughness Rz and the maximum roughness Rmax of the image (after being cured) are measured in accordance with the aforementioned method. The results are shown in Table 2.

(Measurement of Contact Angle) The contact angle of water on the surface of the coating film is measured by a contact angle meter, CA-X (trade name, manufactured by Kyowa Interface Science Co., Ltd.). The results are shown in Table 2.

(Measurement of Transfer Efficiency)

The transfer efficiency (%) of the curable layer (after being cured) to a recording medium is calculated from the weight of the original intermediate transfer belt (10 cm×10 cm), the weight of the coating film formed on the intermediate transfer belt, and the weight of the intermediate transfer belt after the coating film has been transferred onto a recording medium.

Specifically, the transfer efficiency is expressed by a percentage of change of the weight of the coating film on the intermediate transfer belt between before and after the transfer.

(Evaluation of Blurring at Edge of Image)

The occurrence of blurring at the edge of the formed image is evaluated in accordance with the following criteria. The results are shown in Table 2.

A: The width of a line in a printed portion when printed on the recording medium is within the range of ±5%.

B: The width of a line in a printed portion when printed on the recording medium is within the range of ±10%.

C: The width of a line in a printed portion when printed on the recording medium is outside the range of ±10%.

(Evaluation of Unevenness in Printing)

The occurrence of unevenness in printing in the formed image is visually observed in accordance with the following criteria. The results are shown in Table 2.

A: The in-plane density unevenness at three points (with different ink-ejection densities) measured in an image patch portion is within 0.05.

B: The in-plane density unevenness measured in an image patch portion is within 0.1.

C: The in-plane density unevenness measured in an image patch portion exceeds 0.1.

The above in-plane density unevenness is measured using a reflective surface densiometer.

image recording composition onto the intermediate transfer member, the image recording composition containing a curable material that is cured upon application of an external stimulus, water-absorbing resin particles, and a nonionic surfactant, the curable material including silicone-modified acrylic resin and one selected from a group consisting of acryloyl morpholine, N,N-dimethylacrylamide, dipropyleneglycol diacrylate, citric acid, ethylene-oxide-modified trimethylolpropane triacrylate, and polyoxyethylene diacrylate, the water-absorbing resin particles including a crosslinked sulfonic-acid-modified sodium polyacrylate, and the nonionic surfactant being one selected from a group consisting of a polyoxyethylene-propylene block copolymer nonionic surfactant polypropylene oxide ethylene oxide copolymer and block polymer, a polyoxyethylene stearyl amine, a polyoxyethylene lauryl amine, and a polyoxyethylene alkyl amine, the content of the curable material being from 5% to 90% by weight with respect to the total solid content of the image recording composition, the content of the water-absorbing resin particles being from 5% to 80% by weight with respect to the total amount of the image recording composition, and the content of the nonionic surfactant being from 0.01% to 20% by weight with respect to the total amount of the image recording composition;

an ejection unit that ejects an aqueous ink containing an aqueous solvent onto a curable layer formed from the image recording composition that has been supplied onto the intermediate transfer member;

a transfer unit that transfers the curable layer onto which the aqueous ink has been ejected to a recording medium; and

TABLE 2

| | Surface Glossiness (G75°) | Surface Roughness (μm) | Thickness after UV curing (μm) | Contact Angle to Water (%) | Transfer Efficiency (%) | Image Quality | |
|---|---|---|---|---|---|---|---|
| | | | | | | Blurring | Unevenness |
| Example 1 | 88 | 7 | 18 | 42 | 95 | A | A |
| Example 2 | 93 | 9 | 12 | 38 | 96 | A | A |
| Example 3 | 88 | 11 | 21 | 55 | 92 | A | A |
| Example 4 | 94 | 8 | 16 | 44 | 90 | A | A |
| Example 5 | 95 | 6 | 22 | 45 | 94 | A | A |
| Example 6 | 89 | 13 | 19 | 52 | 92 | A | A |
| Example 7 | 100 | 7 | 22 | 33 | 93 | A | A |
| Example 8 | 102 | 9 | 24 | 35 | 97 | A | A |
| Example 9 | 112 | 14 | 20 | 46 | 98 | A | A |
| Example 10 | 104 | 11 | 25 | 44 | 96 | A | A |
| Example 11 | 88 | 15 | 18 | 58 | 91 | A | A |
| Example 12 | 92 | 10 | 17 | 55 | 98 | A | A |
| Example 13 | 85 | 17 | 17 | 57 | 92 | A | A |
| Comp. Example 1 | 78 | 11 | 23 | 53 | 78 | B (Transcending) | C (Partially) |
| Comp. Example 2 | 77 | 17 | 22 | 92 | 89 | B | B |
| Comp. Example 3 | 65 | 13 | 16 | 88 | 85 | B | B |
| Comp. Example 4 | 67 | 21 | 13 | 78 | 69 | C | B |

All publications, patent applications, and technical standards mentioned in this specification are herein incorporated by reference to the same extent as if each individual publication, patent application, or technical standard was specifically and individually indicated to be incorporated by reference.

What is claimed is:

1. A recording apparatus comprising;

an intermediate transfer member;

a supply unit which comprises a housing unit storing an image recording composition, and which supplies the a stimulus application unit that applies a stimulus that cures the curable layer.

2. A recording apparatus comprising:

a supply unit which comprises a housing unit storing an image recording composition, and which supplies the image recording composition onto a recording medium, the image recording composition containing a curable material that is cured upon application of an external stimulus, water-absorbing resin particles, and a nonionic surfactant, the curable material including silicone-modified acrylic resin and one selected from a group consisting of acryloyl morpholine, N,N-dimethylacrylamide, dipropyleneglycol diacrylate, citric acid, ethylene-oxide-modified trimethylolpropane triacrylate, and polyoxyethylene diacrylate, the water-absorbing resin particles including a crosslinked sulfonic-acid-modified sodium polyacrylate, and the nonionic surfactant being one selected from a group consisting of a polyoxyethylene-propylene block copolymer nonionic surfactant polypropylene oxide ethylene oxide copolymer and block polymer, a polyoxyethylene stearyl amine, a polyoxyethylene lauryl amine, and a polyoxyethylene alkyl amine, the content of the curable material being from 5% to 90% by weight with respect to the total solid content of the image recording composition, the content of the water-absorbing resin particles being from 5% to 80% by weight with respect to the total amount of the image recording composition, and the content of the nonionic surfactant being from 0.01% to 20% by weight with respect to the total amount of the image recording composition;

an ejection unit that ejects an aqueous ink containing an aqueous solvent onto a curable layer formed from the image recording composition that has been supplied onto the recording medium; and a stimulus application unit that applies a stimulus that cures the curable layer.

3. An image recording composition comprising: a curable material that is cured upon application of an external stimulus, water-absorbing resin particles, and a nonionic surfactant, the curable material including silicone-modified acrylic resin and one selected from a group consisting of acryloyl morpholine, N,N-dimethylacrylarnide, dipropyleneglycol diacrylate, citric acid, ethylene-oxide-modified trimethylolpropane triacrylate, and polyoxyethylene diacrylate, the water-absorbing resin particles including a crosslinked sulfonic-acid-modified sodium polyacrylate, and the nonionic surfactant being one selected from a group consisting of a polyoxyethylene-propylene block copolymer nonionic surfactant polypropylene oxide ethylene oxide copolymer and block polymer, a polyoxyethylene stearyl amine, a polyoxyethylene lauryl amine, and a polyoxyethylene alkyl amine.

* * * * *